I. E. GIDDINGS.

Improvement in Steam-Traps.

No. 4,954. Reissued June 25, 1872.

WITNESSES.

J. A. Connolly

G. E. Upham.

INVENTOR.

Isaac E. Giddings,

Chipman & Fosmer & Co

Attys.

UNITED STATES PATENT OFFICE.

ISAAC E. GIDDINGS, OF SPRINGFIELD, MASSACHUSETTS.

IMPROVEMENT IN STEAM-TRAPS.

Specification forming part of Letters Patent No. 115,303, dated May 30, 1871; reissue No. 4,954, dated June 25, 1872.

*To all whom it may concern:*

Be it known that I, ISAAC E. GIDDINGS, of Springfield, in the county of Hampden and State of Massachusetts, have invented a new and valuable Improvement in Steam-Traps; and I do hereby declare that the following is a full, clear, and exact description of the construction and operation of the same, reference being had to the annexed drawing making a part of this specification, and to the letters and figures of reference marked thereon.

Figure 1:
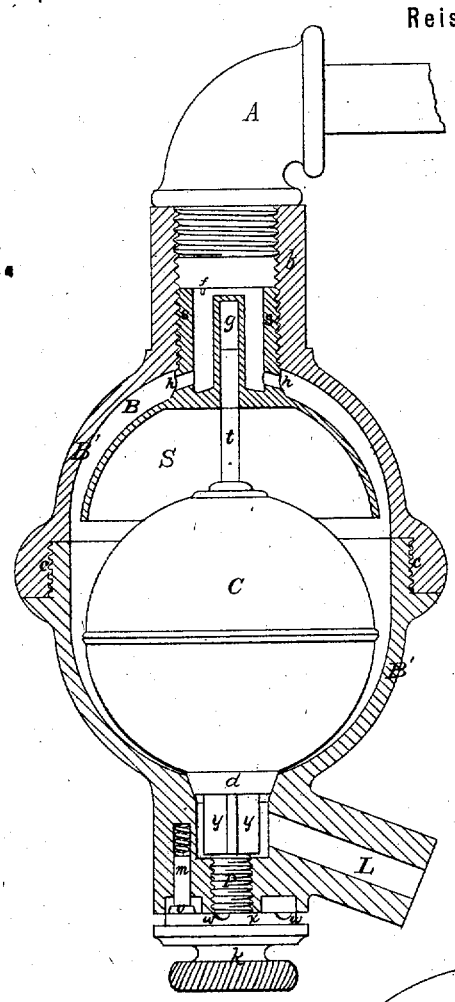
Figure 2:
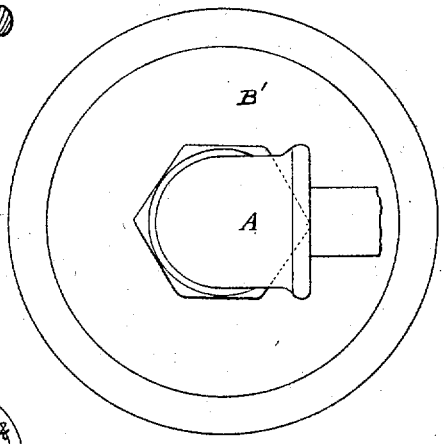
Figure 3:
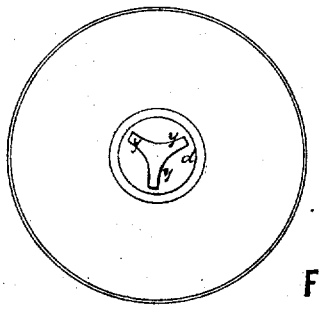
Figure 4:
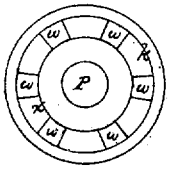

Figure 1 of the drawing is a representation of a side sectional view, Fig. 2 is a top-plan view, and Figs. 3 and 4 are detail views, of my invention.

This invention has relation to steam-traps; and it consists, first, in the construction and novel arrangement of the casing, self-centering float, and valve; and second, in the combination, with the above, of the device for raising the valve at will above its seat and holding it in such position as long as may be desired, for the purpose of allowing, in cold weather, such a small quantity of water as may be insufficient to float the valve to drip away, thus obviating all danger of the trap being incapacitated by freezing.

In the accompanying drawing, the letter A designates the pipe connecting the trap with the steam-cylinder, or other part, in connection with which it is used, to permit the escape of the condensed steam. This pipe is inserted into the neck *b* of the casing B of the trap, said neck being formed with a wrench-seat, for the purpose of readily securing the trap to the pipe. The casing B consists of two hollow and deep cups, B′, secured together by means of a screw-connection, *c*. S represents the shield, which may be hemispherical in form, and should expand sufficiently to permit the float to rise within it, leaving a space between its outside surface and the inner wall of the casing B for a water-passage. The shield is provided at its summit with a projection or neck, *s*, having a screw-thread formed on its exterior wall for the purpose of securing it in the neck *b*. Recesses *f f* are provided in its top for a screw-driver. The neck *s* has at its base two or more ports, *h h*, to conduct the water from the pipe A to the space above the shield S. C designates the float, preferably made of some sheet metal not easily corroded. It may be strengthened by passing the valve-stem *t* diametrically through it, said stem being held at its upper part by means of a nut screwed against the top of the float, and securing the valve-disk *d* immediately to the bottom of said float. Stock is removed from the case B to make a tight valve-seat, and a recess is made beneath it sufficiently large to permit an ample egress of the water, which flows off through the waste-pipe L. Beneath the disk *d* are secured thereto two or more guiding-flanches, *y y*, set radially, and touching lightly the wall of the recess beneath the valve. The float is made to center itself automatically by means of this arrangemem, and by means of the guiding-socket *g* in the neck of the shield, within which plays vertically the upper end of the valve-stem *t*. Let into the lower end of the trap, and coming against the bottom of the flanches *y y*, is the screw *p* rising from a thumb-nut, *k*. From the upper edge of this nut proceeds also a rim, *x*, surrounding the screw *p*, and received into an annular channel in the face of the lower end of the trap. The face of this rim has a stud or projection, *v*, rising from it, and is also provided at regular intervals with small depressions, *w*, the objects of which are as follows: Opposite the rim is a small pin, *m*, contained within a hole in the bottom of the trap, and kept by a small spring at its upper end constantly pressing against the rim, so that when the nut and screw are revolved the pin *m* will be pushed into the first depression in the rim coming opposite its end with sufficient force to mark clearly the degree of revolution given to the screw while offering only a slight resistance to the further turning of the nut; but when the projection *v* comes against the pin its revolution is checked, and the nut can only turn either way to raise the valve off its seat or to leave it perfectly tight therein. Therefore, in winter, when the trap is used in an exposed position, it may be so arranged that a constant drip will be secured, thus obviating entirely the danger of freezing, while in summer the valve may be arranged to close tightly in its seat.

What I claim as my invention, and desire to secure by Letters Patent, is—

1. The combination, with the case and shield, of the self-centering float-valve, arranged substantially as specified.

2. The combination of the float-valve and hemispherical screw-cups forming the casing of the shield, provided with the hollow screw-neck, substantially as specified.

3. The combination, with the case float-valve and shield, of the screw, with its notched rim, projection, and spring-pin, substantially as specified.

In testimony that I claim the above I have hereunto subscribed my name in the presence of two witnesses.

I. E. GIDDINGS.

Attest:
D. D. KANE,
G. E. UPHAM.